Nov. 19, 1935.  D. BRIGHTBILL  2,021,831

SAUSAGE STUFFING MACHINE

Filed July 27, 1933  2 Sheets—Sheet 1

Inventor:
David Brightbill
by his Attorneys
Howson & Howson

Nov. 19, 1935.  D. BRIGHTBILL  2,021,831
SAUSAGE STUFFING MACHINE
Filed July 27, 1933  2 Sheets-Sheet 2
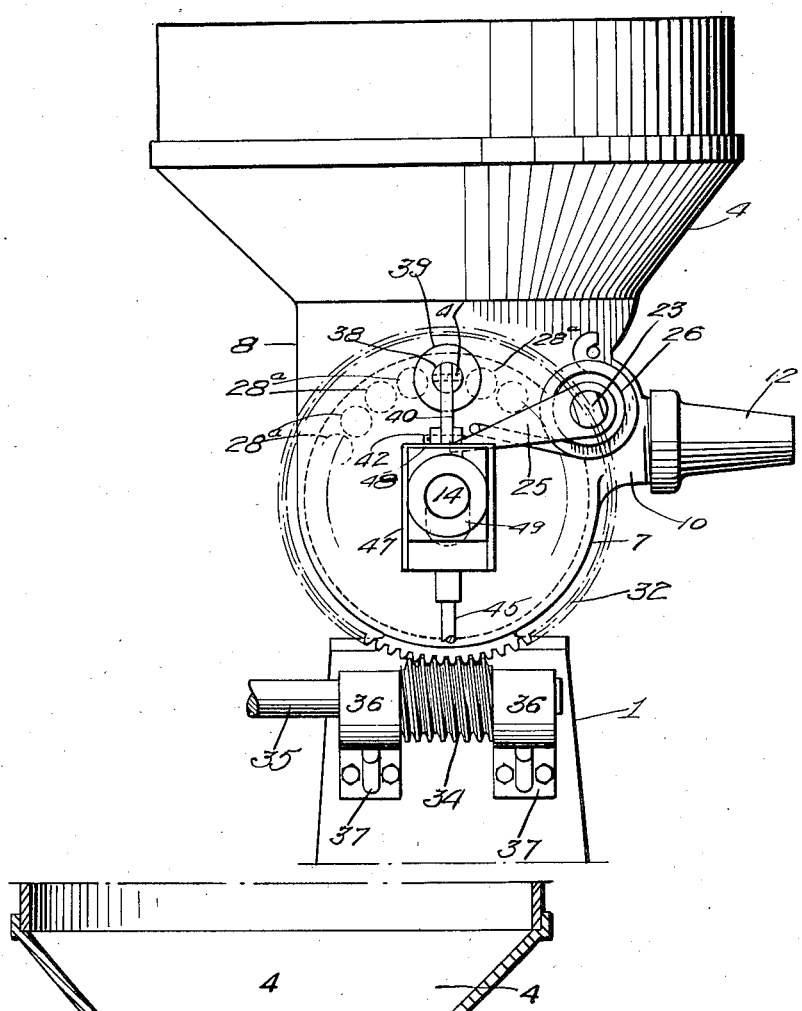
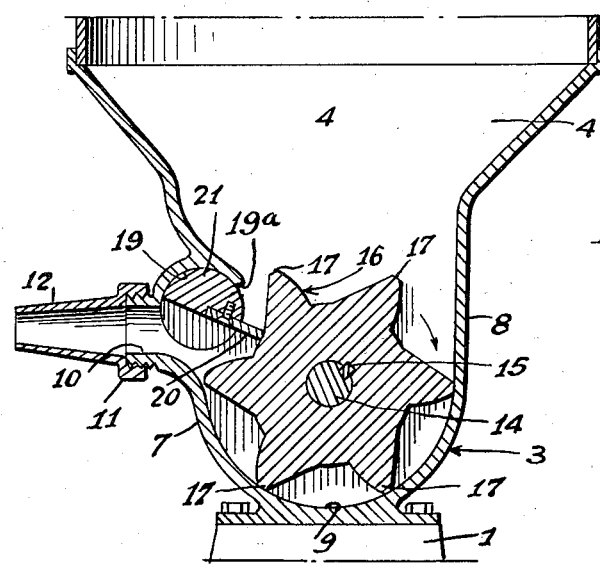
Inventor:—
David Brightbill
by his Attorneys
Howson & Howson Patented Nov. 19, 1935

2,021,831

UNITED STATES PATENT OFFICE 2,021,831

SAUSAGE-STUFFING MACHINE

David Brightbill, Lebanon, Pa.

Application July 27, 1933, Serial No. 682,517

3 Claims. (Cl. 17—35)

This invention relates to sausage stuffing machines of the rotary continuous feed type, wherein the minced meat is deposited in a chamber and thence conveyed through a suitable outlet into the skins in a manner similar to that disclosed in United States Patent No. 1,469,377, issued to me on October 2, 1923.

The principal object of the present invention is to provide a device of the character set forth which is of sturdy, durable construction and comprised of relatively few operative parts, rendering said device capable of economic production.

Other features and details of the invention are set forth hereinafter and disclosed in the accompanying drawings, in which:

Fig. 2 is a view in side elevation of the disclosure in Fig. 1, certain parts of the driving mechanism having been omitted for the purpose of more clearly illustrating other features of the invention;

Fig. 3 is a view in section on line 3—3, Fig. 1; and

Figure 1:
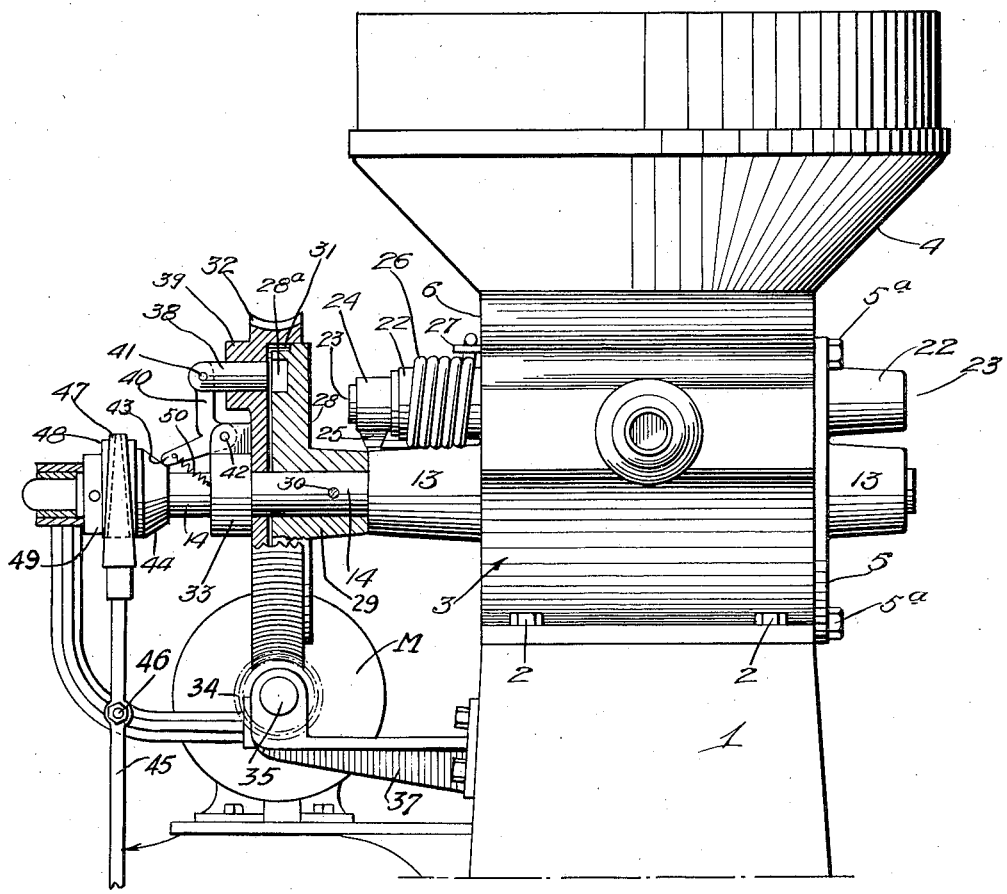
Fig. 1 is a view in front elevation of the machine, having certain parts thereof shown in section to disclose the detail construction of the drive connecting means for operating said stuffing machine.

Referring now more particularly to the drawings, reference numeral 1 indicates a base or frame, whereon is supported and secured, as by bolts 2, a casing 3 having an outwardly flared upper portion 4 in the shape of a hopper or funnel and a restricted lower portion made with substantially vertical side walls 5 and 6, front and rear walls 7 and 8, and a bottom 9, respectively. An outlet nozzle 10 is provided in the front wall 7 for the conveyance of the meat outwardly of the chamber into the skins, the mouth of said nozzle 10 being externally threaded as at 11 for the attachment thereto of a spout 12 of the kind commonly used for this purpose. Removably journaled in hubs 13, 13 externally formed on the side walls 5 and 6, respectively, of the casing 3, is a horizontal shaft 14 extending centrally through the chamber, and secured thereto by means of a key 15 is a cylindrical rotor or drum 16 having at least four radially extending wings or teeth 17 designed to mesh with a blade 20 disposed in an appropriately formed seat 19 extending across the inner side of the front wall 7 immediately above the nozzle 10 formed in the latter, said blade effectually sealing the space between the front upper wall and the drum 16 against passage of the meat and operable to draw or suck the meat downwardly from the hopper between the teeth 17 as hereinafter described.

In the present instance the blade 20 is mounted on the plane surface of a pivotable member 21, which is fitted into the seat 19 and has its extreme portions machined down to form supporting spindles 23 at each end thereof, said spindles being removably journaled in bearings 22, 22 formed externally of the side walls 5 and 6 of the casing 3.

In the present instance one of the spindles 23, see Fig. 1, extends beyond its bearing 22 and the hub 24 of an arm 25 is fixedly secured thereon, the other end of said arm 25 being of such length as to contact with the extreme peripheral surface of the adjacent hub 13 in order to limit rotation of the blade 20 within the casing 3. Rotation in the opposite or counter-clockwise direction with respect to Fig. 3, is limited by the inner edge 19a of the seat 19, which is engaged by the blade 20 mounted on the pivotal member 21. A coil spring 26 embraces the adjacent hub 22 and one end thereof engages a pin 27 which projects from the adjacent side 6 of the casing 3 and the opposite end of said spring 26 engages the arm 25 adjacent its radial extremity. The spring 26 tends to rotate the blade 20 in a clockwise direction in respect to Fig. 3, which rotation as previously stated is limited by contact of the radial end of the arm 25 with the adjacent hub 13. It will be noted therefore, that movement of the blade in a counter-clockwise direction with respect to Fig. 3, takes place against the action of the spring 26.

In the present instance rotation of the drum 16 is in a clockwise direction with respect to Fig. 3 of the drawings and with said drum and blade in the relative positions shown in Fig. 3, said blade is in its extreme clockwise position and upon further rotation of the drum 16 in the direction of the arrow, the front face of the next succeeding tooth 17 will engage the blade 20 and rotate the same in a counter-clockwise direction against spring 26 until the blade is in a position to permit the peripheral surface of said tooth 17 to pass out of engagement with said blade and continue in free rotation. The rear or secondary face of the blade is provided with a plane surface disposed at an angle to permit said blade 20, the edge of which is always in contact with the periphery of the drum, to be rotated in a clockwise direction by means of the spring

26, to the other extreme position limited by the arm 25 contacting the hub 13, thus always effectually sealing the space between the front wall and the drum against the passage of the meat.

Figure 4:
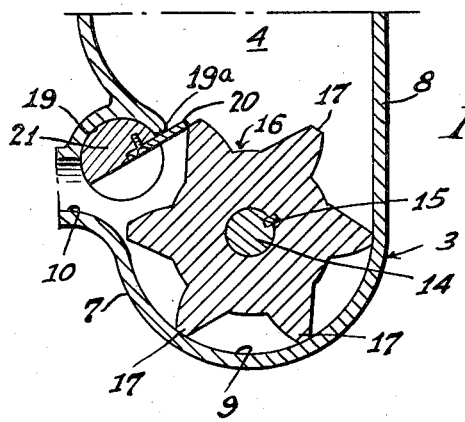
Fig. 4 is a fragmentary view similar to the disclosure in Fig. 3 showing the position of the blade after actuation by the drum.

Primarily the blade 20 functions to suck or draw the minced meat in the hopper 4 downwardly into the space between the wall and drum intermediate the successively spaced teeth 17 of the latter as the blade is returned to the position shown in Fig. 3 by means of the spring 26, after each successive tooth 17 actuates the blade in a counterclockwise direction with respect to and as shown in Fig. 4 to permit the radial extremity of the teeth to pass out of engagement with the blade, said blade is actuated to the position shown in Fig. 3 by the spring 26 and because of its contact with the periphery of the drum 16 creates a suction pocket at the hopper side thereof which draws the minced meat downwardly into the teeth 17 for carriage by the drum outwardly of the nozzle 10. This arrangement of the blade 20 eliminates the necessary weights and agitators used heretofore to give the minced meat a downward movement so as to be engaged by the teeth of the drum.

It is pointed out at this time that as the succeeding teeth 17 of the drum move into position to discharge the minced meat carried between each pair of adjacent teeth outwardly of the nozzle 10, the strength of the spring 26 pressure exerted downwardly on the blade 20 by the meat is sufficient to offset the pressure exerted by the teeth 17 against the underside of the blade in discharging the meat outwardly of the machine. In addition, the blade 20 acts as a scraper to clean or remove any meat from the teeth and drum 17 and 16, respectively, that may tend to adhere thereto.

The shaft 14 carrying the drum 16 is driven by means of a disk 28 having a hub 29 fixedly secured on said shaft 14 by means of pin 30, the disk 28 being provided with a series of radially disposed apertures 28a formed in the outer face thereof. In the present instance the disk 28 resides in a recess 31 formed in the inner face of the worm wheel 32 having a hub 33 which is rotatably mounted upon the shaft 14, and this worm wheel 32 meshes with a worm gear 34 which is mounted on a shaft 35 connected to a suitable source of rotative power such as motor M. The shaft 35 is rotatably supported in bearings 36, 36 formed on the extremities of brackets 37, 37, which are secured to the adjacent face of the base or frame 1.

Driving connection between the worm wheel 32 and the disk 28 is accomplished by means of a pin 38 slidably mounted in a lug 39 formed on said worm wheel 32 adjacent its periphery. A substantially L-shaped member 40 is connected at one end as at 41 to the outer extremity of the pin 38 and at its vertex to a web formed on the hub 33 as at 42, the extremity of the other arm of said member 40 being rounded as at 43 in order that it may more easily ride upon the inclined surface of a frusto-conical clutch section 44 as the latter is actuated toward or away from the hub 33 on the shaft 14. The conical section 44 is moved longitudinally of the shaft 14 by means of a lever 45 pivoted at 46 and connected to the hub by means of a wedge shaped collar member 47 which rides within a grooved pulley 48 fixed on the hub portion 49 of the clutching member 44.

It will be seen therefore, that when the arm or lever 45 is pivoted in a clockwise direction about its pivot 46, the clutch 44 will be moved longitudinally of the shaft 14 toward the hub 33. This inward movement of the clutch 44 will cause the end 43 of the L-shaped member 40 to ride up the frusto-conical surface of said clutch and to pivot lever 40 in a clockwise direction, thrusting the pin 38 to the right with respect to Fig. 1 and engaging it with one of the apertures formed in the adjacent face of the disk 28. A spring 50 is connected between the arm of the member 40 and the hub 33, said spring tending to pivot said member 40 in a counter-clockwise direction, reference being had to Fig. 1, so that when the lever 45 is pivoted in the opposite direction to that before stated, and the clutch moves away from the hub 33 on shaft 14, the pin 38 will be withdrawn from engagement with the aperture in the disk 28, thus breaking the driving connection to the shaft 14 and the drum 16.

In the operation of the device, the minced meat is deposited in the hopper, which is designed to receive and hold a considerable quantity of said meat, thereby relieving the operator of the necessity of constantly filling the same. The mechanism being now set in motion through the application of power to the drive shaft 35, the drum 16 rotates in the direction indicated by the arrow in Fig. 3, carrying the meat as the same is drawn or sucked from the hopper by the by the intermittent actuation of the blade 20 and into the chamber, and out through the nozzle into the skins, the teeth 17 of the drum in turn actuating the blade 20.

It is often desirable, for the purpose of facilitating cleaning of the device to comply with the pure food laws, to construct the casing 3 with its side wall 5 as well as the blade 20 and drum 16 removable to permit access to the interior of the casing, and accordingly in the drawings, this side wall 5 is shown as detachably mounted by means of bolts 5a.

While it is preferable to embody the particular structural details disclosed in the present invention, it may be desirable to incorporate other mechanisms such as a different clutching means to establish the driving connection, without departing from the spirit of the invention.

I claim:

1. In a machine including a hopper for supplying material to the machine, the combination with a chamber including a wall having an outlet therein, of a toothed drum rotatable in said chamber and having its teeth arranged to contact the peripheral wall of the chamber, means mounted above the outlet extending between the wall and drum and arranged for intermittent actuation by the teeth of the latter, and means operable to return said means to its initial position during the intervals between successive actuations by said teeth whereby an evacuated suction pocket is created at the hopper side of the first mentioned means to effectually draw the material into said pocket from the hopper and between adjacent teeth of said drum for carriage to the outlet.

2. In a machine including a hopper for supplying material to the machine, the combination with a chamber including a wall having an outlet therein, of a toothed drum rotatable in said chamber and having its teeth arranged to contact the peripheral wall of the chamber, a pivotally mounted blade above the outlet extending between the wall and drum and arranged for intermittent actuation by the teeth of the latter, and means operable to return said blade to its initial position during the intervals between successive actuations by said teeth whereby an evacuated suction pocket is created at the hopper side of the first mentioned means to effectually draw the material into said pocket from the hopper and between adjacent teeth of said drum for carriage to the outlet.

3. In a machine including a hopper for supplying material to the machine, the combination with a chamber including a wall having an outlet therein, of a toothed drum rotatable in said chamber and having its teeth arranged to contact the peripheral wall of the chamber, pivotally mounted means above the outlet extending between the wall and drum and arranged for intermittent actuation by the latter, and means operable to return said means to its initial position during the intervals between successive actuations by said teeth whereby an evacuated suction pocket is created at the hopper side of the first mentioned means to effectually draw the material into said pocket from the hopper and between adjacent teeth of said drum for carriage to the outlet.

DAVID BRIGHTBILL.